(12) United States Patent
Schott et al.

(10) Patent No.: US 8,211,215 B2
(45) Date of Patent: Jul. 3, 2012

(54) INSTRUMENT GAS CONDITIONING SYSTEM AND APPARATUS

(75) Inventors: Jeff Schott, Houston, TX (US); Eric Almaraz, Cypress, TX (US)

(73) Assignee: RMS Controls, Inc., Spring, TX (US)

( * ) Notice: Subject to any disclaimer, the term of this patent is extended or adjusted under 35 U.S.C. 154(b) by 373 days.

(21) Appl. No.: 12/497,808

(22) Filed: Jul. 6, 2009

(65) Prior Publication Data

US 2011/0000365 A1    Jan. 6, 2011

(51) Int. Cl.
*B01D 46/00* (2006.01)

(52) U.S. Cl. .................. 95/273; 95/19; 95/284; 95/286; 55/385.1

(58) Field of Classification Search ................ 95/14, 15, 95/18, 19, 22, 273, 284, 20, 21, 286; 55/385.1, 55/484
See application file for complete search history.

(56) References Cited

OTHER PUBLICATIONS

Dresser, Inc. PIC Pressure Instrumentation Column brochure, 2008.*
Dresser, Inc. Model FD-1500 Filter-Dryer brochure, 2008.*
RMS Controls Instrument Supply Post ISP2 Offered for Sale as of May 15, 2007.
Peter Atkins, Physical Chemistry, 1997, p. 86-90, Sixth Edition, W.H. Freeman and Company, New York.
http://en.wikipedia.org/wiki/Joule-Thomson_effect, Printed Jun. 26, 2009.
Walker, Manual for System on Sale no Earlier Then Aug. 11, 2008.

* cited by examiner

*Primary Examiner* — Robert Clemente
(74) *Attorney, Agent, or Firm* — Greenberg Traurig, LLP

(57) ABSTRACT

An instrument gas conditioning system is provided. The system includes filtering, and optionally drying, a gas stream to obtain a filtered, and optionally dried, gas stream. The filtered, and optionally dried, gas stream is heated in a heater and then regulated through a regulator. The filtered, heated, regulated, and, optionally dried, gas stream may be used as instrumentation gas.

21 Claims, 1 Drawing Sheet

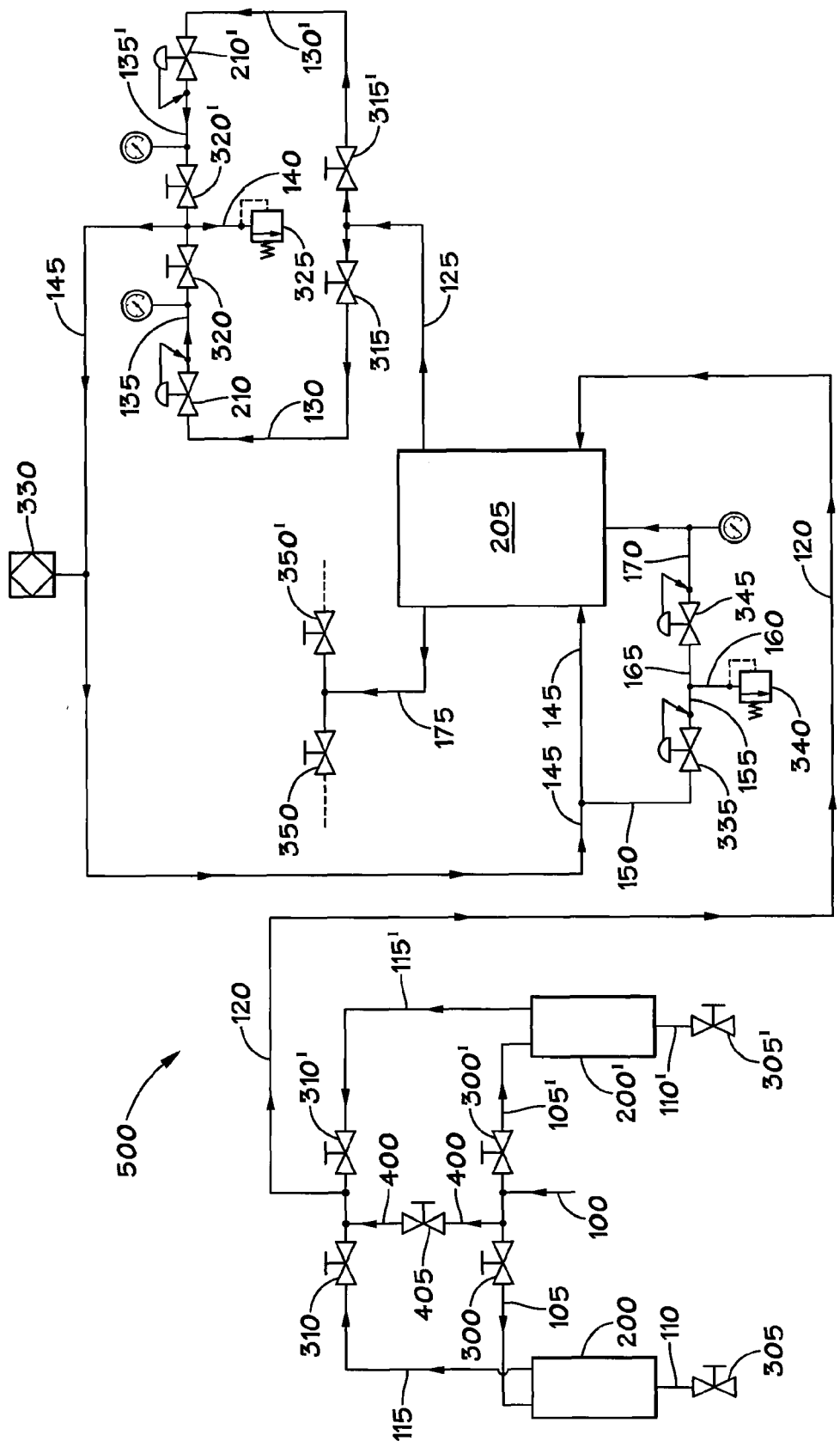

INSTRUMENT GAS CONDITIONING SYSTEM AND APPARATUS

CROSS REFERENCE TO RELATED APPLICATIONS

None.

BACKGROUND OF THE INVENTION

1. Field of the Invention

The present apparatus and system relate generally to conditioning gas for use in instrumentation. More specifically, the apparatus and system relate to filtering, heating, and regulating natural gas such that the gas is suitable for use in instrumentation.

2. Description of the Related Art

Generally, chemical and manufacturing plants use clean, dry compressed air to run their instrumentation. In remote locations such as a natural gas pipeline field, however, compressed air is either not readily available or cost prohibitive. Accordingly, it has been desirable to use available, cost effective gas to run the instrumentation. In the case of a natural gas pipeline field, the available, cost effective gas is natural gas. Before the natural gas can be used in the instrumentation it must be conditioned.

SUMMARY OF THE INVENTIONS

Various illustrative embodiments herein provide an instrument gas conditioning system and apparatus. In accordance with one aspect of an illustrative embodiment, the system may include filtering, and optionally drying, a gas stream to obtain a filtered, and optionally dried, gas stream. The filtered, and optionally dried, gas stream may be heated in a heater and then regulated through a regulator. The filtered, heated, regulated, and, optionally dried, gas stream may be used as instrumentation gas.

In accordance with an alternative illustrative embodiment, the filtered, heated, regulated, and optionally dried, gas stream may be heated again through a second pass of the first heater. In a still further alternative illustrative embodiment, the filter may include a deodorizer.

BRIEF DESCRIPTION OF THE DRAWING

The present gas conditioning system may be understood by reference to the following description taken in conjunction with the accompanying drawing FIGURE which is not to scale and contains certain aspects in exaggerated or schematic form in the interest of clarity and conciseness, wherein the same reference numerals are used throughout this description and in the drawing for components having the same structure, and primed reference numerals are used for components having a similar function and construction to those elements bearing the same unprimed reference numerals, and wherein:

FIG. 1 is a schematic of an illustrative embodiment of a gas conditioning system.

DETAILED DESCRIPTION OF THE SPECIFIC EMBODIMENTS

FIG. 1 includes a representative schematic of one embodiment of a gas conditioning system 500. In an embodiment, gas, preferably natural gas obtained as a side stream off of a natural gas product pipeline, may be fed through a first line 100, via an optional first valve 300 and then a second line 105, into a filter 200. Gas in the first line 100 and second line 105 may be at a relatively high pressure, for example ranging from about 250 psig to about 2,500 psig. Gas in the first line 100 and second line 105 may be at a relatively ambient, or atmospheric, temperature, for example ranging from about 0 degrees C. to about 50 degrees C., alternatively from 10 degrees C. to about 40 degrees C., and alternatively from 25 degrees C. to about 35 degrees C.

Suitable filters 200 may include the F5 series obtained from Welker Flow Measurement Systems, Inc., located in Sugar Land, Tex. Alternative filters 200 may include the FD-1500 series obtained from Becker Precision Equipment, located in Elk Grove Village, Ill. Still further the filter 200 may include a desiccant (not shown) to remove any residual liquids, such as water. The residual liquids, if any, may be drained from the filter 200, optionally through a lower portion of the filter 200, via a first filter outlet line 110. Optionally, a second valve 305 controls the flow of liquid through the first filter outlet line 110. Still further, the filter 200 may include a deodorizer (not shown).

In an embodiment, filtered, and optionally dried, gas may exit the filter 200 through an upper portion of the filter 200, via a second filter outlet line 115. In an embodiment, the gas may be filtered to about 15 microns; alternatively to about 10 microns; alternatively to about 5 microns. In an embodiment, the gas may be dried to about a −40° C. dewpoint; alternatively to about a −30° C. dewpoint; alternatively to about a −20° C. dewpoint. The flow of gas in the second filter outlet line 115 may be controlled via an optional third valve 310 into a first heater inlet line 120. In an embodiment, the filter 200 may include a bypass line 400 having a bypass valve 405. Without wishing to be bound by the theory, the bypass line 400 may permit continuous operation of the system 500 while the filter 200 is being serviced.

Optionally, the system 100 includes at least one redundant filter 200', which may be the same or different as the first filter 200. Gas flow from the first line 100 through the redundant second line 105' may be controlled via an optional redundant first valve 300' into the redundant filter 200'. The pressure and temperature of the gas within the redundant second line 105' may be the same as, or similar to, the pressure and temperature of the gas within the first line 100 and the second line 105. Residual liquids, if any, may be drained from the redundant filter 200', optionally through a lower portion of the redundant filter 200', via a redundant first filter outlet line 110'. Optionally, a redundant second valve 305' controls the flow of liquid through the first redundant filter outlet line 110'. Further, filtered gas may exit the redundant filter 200', optionally through an upper portion of the redundant filter 200', via a redundant second filter outlet line 115'. The gas in the redundant second filter outlet line 115' may have the same, or similar, average particulate size and dewpoint as the gas in the second filter outlet line 115. The redundant filter 200' may include a deodorizer. Flow of gas through the redundant second filter outlet line 115' may be controlled via an optional redundant third valve 310' into the first heater inlet line 120. In an embodiment, the filter 200, or the redundant filter 200', may be isolated for service including repair or removal while the system 400 is still in service. Isolation of the filter 200 or the redundant filter 200' may be obtained via manipulation of the first valve 300, the first redundant valve 300', the third valve 310, and the third redundant valve 310'.

Gas may be fed through the first heater inlet line 120 into the heater 205, optionally into a bottom portion of the heater 205. Suitable heaters 205 include dual pass catalytic heaters such the "Freez-Fiter" available from Bruest Catalytic Heaters, located in Independence, Kans. Within the heater 205, the temperature of the gas may be increased by about 5° C., per heater pass; alternatively the temperature of the gas may be increased by about 7° C. to about 15° C., per heater pass; alternatively the temperature of the gas may be increased by about 10° C. to about 20° C., per heater pass.

Gas may pass from the heater 205, optionally from an upper portion of the heater 205, via a first heater outlet line 125 through a regulator inlet line 130 to a high pressure regulator 210. The gas flow from the heater 205 via the first heater outlet line 125 through the regulator inlet line 130 may be controlled by an optional fourth valve 315. Suitable high pressure regulators 210 may include the 1301F available from Fisher Regulators, located in Marshalltown, Iowa. Alternatively suitable high pressure regulators 210 may include the P39 available from BelGas Regulators, located in Newell, West Va. Alternatively suitable high pressure regulators 210 may also include the SGL500 available from MECO Regulators, located in St. Louis, Mo. The regulator 210 may reduce the pressure of the gas such that the pressure of the gas exiting the regulator 210 within a regulator outlet line 135 may be about 30 psig to about 200 psig; alternatively at most about 100 psig; alternatively at most about 150 psig; alternatively at most about 200 psig.

Without wishing to be bound by the theory, the reduction of pressure through the regulator 210 causes the temperature of the gas to be reduced, as according to the Joule-Thompson effect, which states: when a gas expands through a porous plug, a change of temperature occurs, proportional to the pressure difference across the plug. The temperature change is due to a departure of the gas from Joule's laws (for "ideal gases", the internal energy of a given mass of gas is independent of its volume and pressure, being a function of temperature alone), the gas performing internal work in overcoming the mutual attractions of the molecules and thus cooling itself, and partly a deviation of the gas from Boyle's law (for "ideal gases", for a given mass of gas held at a constant temperature, pressure (p) and volume (V) are inversely proportional: pV=constant). The latter effect can give rise to either to cooling or heating, depending upon the initial temperature and pressure difference used. For a given mean pressure, the temperature at which the two effects balance, resulting in no alteration of temperature, is called the inversion temperature. Gases expanding through a porous plug below their inversion temperature are cooled, otherwise they are heated.

The gas within the regulator outlet line 135 may be fed either to a regulator outlet line 145 or a first relief line 140. The flow of gas from the regulator outlet line 135 to either the regulator outlet line 145 or the first relief line 140 may be controlled via an optional fifth valve 320. Gas flowing into the first relief line 140 may be either released to the atmosphere, or optionally captured and recycled, via an optional relief valve 325. In an embodiment, the relief valve 325 protects the downstream system in the event the regulator 210 fails. The set point of the relief valve 325 may be from about 60 psig to about 200 psig; alternatively from about 150 psig to about 175 psig.

Optionally, gas may pass from the heater 205 via the first heater outlet line through a secondary regulator inlet line 130' to a secondary high pressure regulator 210'. The gas flow from the heater 205 via the first heater outlet line 125 through the secondary regulator inlet line 130' may be controlled by an optional secondary fourth valve 315'. Suitable secondary high pressure regulators 210' may include those suitable for use as the high pressure regulator 210. The pressure and temperature of gas exiting the secondary regulator 210' within a secondary regulator outlet line 135' may the same, or similar to, the pressure and temperature of the gas in the regulator outlet line 135. Gas within the secondary regulator outlet line 135' may be fed either to the regulator outlet line 145 or the first relief line 140. The flow of gas from the secondary regulator outlet line 135' to either the regulator outlet line 145 or the first relief line 140 may be controlled via an optional secondary fifth valve 320'. In an embodiment, the regulator 210 or the redundant regulator 210' may be isolated for service including repair or removal while the system 500 is still in service. Isolation of the regulator 210 or the redundant regulator 210' may be obtained via manipulation of the fourth valve 315, the fourth redundant valve 315', the fifth valve 320, and the fifth redundant valve 320'.

In an embodiment, the set point pressure of the high pressure regulator 210 is different from the set point pressure of the secondary high pressure regulator 210'. The difference in set point pressure between the high pressure regulator 210 and the secondary high pressure regulator 210' may be by about 5 psi to about 10 psi. Without wishing to be bound by the theory, the higher set point pressure of either the high pressure regulator 210 and the secondary high pressure regulator 210' may be such that when the filter 200 may be clean and properly working, the regulator (either 210 or 210', whichever has the higher set point pressure) may be active and working. However, when the filter 200 becomes dirty, or the demand increases, the pressure within the entire system is lowered and only the regulator (either 210 or 210', which has the lower set point pressure) is active and working. An optional pressure switch, or pressure transmitter, 330 may be placed along the regulator outlet line 145, and in an embodiment, between the high pressure regulator 210 and the secondary high pressure regulator 210'. If the pressure switch, or pressure transmitter, 330 detects a change, most often a decreasing change, in pressure it preferably signals to either, or both, a human operator or computer to service either filer 200 or redundant filter 200'. A temporary indication may be expected when demand exceeds the regulator's capacity; however, this temporary indication may not necessarily mean the filter 200 or the redundant filter 200' has failed.

Optionally, a side stream 150 off of the regulator outlet line 145 may be taken to fuel the heater 200. Gas from the side stream 150 may be further regulated via an optional middle pressure regulator 335 and passed from the middle pressure regulator 335 via a middle pressure outlet line 155 to a second relief valve stream 160 and/or a low pressure regulator inlet line 165. Gas flowing into the second relief valve stream 160 may be either released to the atmosphere, or optionally captured and recycled, via an optional second relief valve 340. In an embodiment, the second relief valve 340 may protect the downstream system in the event the middle pressure regulator 335 fails. The set point of the second relief valve 340 may be from about 30 psig to about 50 psig. Gas flowing into the low pressure regulator inlet line 165 may be further regulated in an optional low pressure regulator 345. Gas exiting the low pressure regulator 345 may flow via a fuel inlet line 170 into the heater 205 and consumed as fuel. The pressure of the gas in the middle pressure outlet line 155 may range from about 10 psig to about 45 psig. The pressure of the gas in the fuel inlet line 170 may range from about 0.04 psig to about 0.13 psig; alternatively at a pressure less than about 1 psig.

Gas in the regulator outlet line 145 may enter the heater 205, optionally at a bottom portion of the heater, and exit the heater 205 through a second heater outlet line 175. Within the heater 205, the temperature of the gas may be increased by about 5° C., per heater pass; alternatively the temperature of the gas may be increased by about 7° C. to about 15° C., per heater pass; alternatively the temperature of the gas may be increased by about 10° C. to about 20° C., per heater pass. Optionally, heater 205 may include a single pass (not shown), and gas in the regulator outlet line 145 flows directly to the second heater outlet line 175. Gas in the second heater outlet line 175 may be at a pressure ranging from about 30 psig to about 200 psig.

The gas in the second heater outlet line 175 may be used within instrumentation (not shown). The flow of gas from the second heater outlet line 175 to instrumentation (not shown) may be controlled by a sixth optional valve 350, as well as a redundant sixth optional valve 350'. In an embodiment, the sixth optional valve 350 and the redundant sixth optional valve 350' may be full port ball valves, ¼ inch NPT, and stainless steel. These valves may carry API6D, ANSI 900#, and NACE certification.

While certain embodiments of the present gas conditioning system have been described in connection with various preferred illustrative embodiments shown herein, it will be understood that it is not intended to limit the gas conditioning system to those embodiments. On the contrary, it is intended to cover all alternatives, modifications, and equivalents, as may be included within the spirit and scope of the gas conditioning system as defined by the appended claims.

We claim:

1. An instrument gas conditioning process comprising:
   filtering a gas stream in a first filter to obtain a filtered gas stream having particulates with an average particulate size of less than about 15 microns; then
   heating the filtered gas stream in a first heater by at least about 5° C. to obtain a filtered, heated gas stream; then
   regulating the filtered, heated gas stream in a first regulator to at most about 200 psig to obtain a filtered, heated, regulated gas stream; and then
   heating the filtered, heated, regulated gas stream in the first heater by at least about 5° C. to obtain a product gas stream.

2. The instrument gas conditioning process of claim 1, further including drying the filtered gas stream to about a −40° C. dewpoint.

3. The instrument gas conditioning process of claim 1, further comprising using the product gas stream in instrumentation.

4. The instrument gas conditioning process of claim 1, having a redundant filter and a redundant regulator.

5. The instrument gas conditioning process of claim 1, wherein the gas stream is a natural gas stream.

6. The instrument gas conditioning process of claim 4, further comprising servicing the first filter while the process is still in service.

7. The instrument gas conditioning process of claim 1, wherein the filter further comprises a bypass line adapted to permit continuous operation of the gas conditioning process while the filter is being serviced.

8. The instrument gas conditioning process of claim 4, further comprising informing a computer, or a human, that the first filter or the redundant filter requires service.

9. The instrument gas conditioning process of claim 1, wherein the first filter further comprises a deodorizer.

10. The instrument gas conditioning process of claim 4, wherein the first filter, and the redundant filter, each further comprise a deodorizer.

11. The instrument gas conditioning process of claim 10, wherein the first filter, and the redundant filter, each further comprise a desiccant.

12. The instrument gas conditioning process of claim 4, wherein the first regulator has a first set point and the redundant regulator has a second set point, and wherein the pressure difference between first set point and the second set point ranges from about 5 psi to about 10 psi.

13. The instrument gas conditioning process of claim 12, wherein a pressure indicator measures changes in the pressure of the gas exiting the first regulator and the redundant regulator.

14. The instrument gas conditioning process of claim 13, wherein the pressure indicator is a pressure switch.

15. The instrument gas conditioning process of claim 13, wherein the pressure indicator is a pressure transmitter.

16. The instrument gas conditioning process of claim 13, wherein the pressure indicator informs a computer, or a human, that the first filter or the redundant filter requires service.

17. The instrument gas conditioning process of claim 1, wherein the filtered gas stream has particulates with an average particulate size ranging from about 5 microns to about 15 microns.

18. The instrument gas conditioning process of claim 1, wherein the filtered gas stream in the first heater is heated by an amount ranging from about 5° C. to about 20° C.

19. The instrument gas conditioning process of claim 1, wherein the filtered gas stream in the first regulator is regulated to between about 30 psig to about 200 psig.

20. The instrument gas conditioning process of claim 1, further comprising; utilizing at least a one full port ball ¼ inch NPT stainless steel valves to control the filtered, heated, regulated gas stream.

21. An instrument gas conditioning apparatus comprising:
   a gas filter adapted to filter natural gas to obtain a filtered gas stream having particulates with an average particulate size of less than about 15 microns;
   a heater adapted to heat the filtered gas stream by at least about 5° C.;
   a regulator adapted to regulate the filtered, heated gas stream to at most about 200 psig; and
   wherein the gas filter is in fluid communication with the heater, the heater is in fluid communication with the regulator, and the filter is in fluid communication with the regulator through the heater.

* * * * *